(12) United States Patent
Chang et al.

(10) Patent No.: US 11,340,517 B2
(45) Date of Patent: May 24, 2022

(54) PROJECTION LENS MODULE AND PROJECTOR

(71) Applicant: Coretronic Corporation, Hsin-Chu (TW)

(72) Inventors: Kuang-Hsiang Chang, Hsin-Chu (TW); Ching-Chuan Wei, Hsin-Chu (TW); Tsung-Hsin Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/131,693

(22) Filed: Dec. 22, 2020

(65) Prior Publication Data
US 2021/0199932 A1 Jul. 1, 2021

(30) Foreign Application Priority Data
Dec. 26, 2019 (CN) .......................... 201922372360.5

(51) Int. Cl.
| | |
|---|---|
| *G02B 13/16* | (2006.01) |
| *H04N 9/31* | (2006.01) |
| *G02B 7/02* | (2021.01) |
| *G03B 21/20* | (2006.01) |

(Continued)

(52) U.S. Cl.
CPC ............ *G03B 21/142* (2013.01); *G02B 5/04* (2013.01); *G02B 7/021* (2013.01); *G02B 13/16* (2013.01); *G03B 21/145* (2013.01); *G03B 21/2033* (2013.01); *H04N 9/3197* (2013.01)

(58) Field of Classification Search
CPC .......... G02B 13/16; G02B 5/04; G02B 7/021; G03B 21/145; G03B 21/2033; H04N 9/3197
See application file for complete search history.

(56) References Cited

U.S. PATENT DOCUMENTS

| | | | |
|---|---|---|---|
| 7,477,799 B2* | 1/2009 | Chang | G03B 21/008 382/293 |
| 2009/0262315 A1* | 10/2009 | Tseng | G03B 21/14 353/119 |

(Continued)

FOREIGN PATENT DOCUMENTS

| | | | | |
|---|---|---|---|---|
| CN | 108802963 | | 11/2018 | |
| CN | 109270669 | | 1/2019 | |
| TW | 200839412 A | * | 10/2008 | ............. G03B 21/00 |

*Primary Examiner* — Magda Cruz
(74) *Attorney, Agent, or Firm* — JCIPRNET

(57) ABSTRACT

A projection lens module and a projector are provided. The projector includes an optical engine and a projection lens module. The optical engine includes a casing, a light source, a light valve, and a prism, where the light source, the light valve, and the prism are disposed in the casing. The light source emits an illumination beam to the light valve. The light valve modulates the illumination beam to generate an image beam and projects the image beam to the projection lens module. The prism is disposed on an optical path of the image beam. The projection lens module is connected to the casing of the optical engine and is configured to project the image beam. The projection lens module includes a projection lens and a smooth picture actuator, where the smooth picture actuator is fixed to the projection lens and is located outside the optical engine.

14 Claims, 8 Drawing Sheets

(51) Int. Cl.
*G02B 5/04* (2006.01)
*G03B 21/14* (2006.01)

(56) References Cited

U.S. PATENT DOCUMENTS

2010/0110389 A1\* 5/2010 Liao ................ G03B 21/14
                                                                                     353/31
2016/0370575 A1\* 12/2016 Lin ................ G02B 26/085
2017/0293210 A1\* 10/2017 Shimizu ............... G03B 21/142
2019/0235364 A1\* 8/2019 Chen .................. G03B 21/005

\* cited by examiner

PROJECTION LENS MODULE AND PROJECTOR

CROSS-REFERENCE TO RELATED APPLICATION

This application claims the priority benefit of China application serial no. 201922372360.5, filed on Dec. 26, 2019. The entirety of the above-mentioned patent application is hereby incorporated by reference herein and made a part of this specification.

BACKGROUND OF THE INVENTION

Field of the Invention

The invention relates to a projection lens module and a projector, and in particular, to a projection lens module having a smooth picture actuator and a projector.

Description of Related Art

A projector is configured to produce large-size images. The projector may perform projection by using a digital micromirror device (DMD). To improve the quality of a displayed image formed by the projector, a transmissive smooth picture (TSP) actuator may be disposed on an optical path of the projector. The TSP actuator drives thin flat glass through a voice coil motor, to periodically swing back and forth in a specific direction, and then matches with a specific frequency of the DMD and the visual persistence effect of human eyes, so as to improve picture resolution. Such technology may increase the image resolution without increasing a quantity of mirrors of the DMD.

Since the TSP actuator has a coil structure, the volume cannot be easily reduced, and the volume of an optical engine also cannot be easily reduced. Consequently, the development of pico projectors meets a bottleneck. In addition, to reduce the volume of the optical engine, an outer frame of the TSP actuator is required to be reduced, which results in the difficulty of designing the TSP actuator, poor stability, and higher costs. Therefore, how to avoid that the TSP actuator affects the size of the optical engine is an important issue in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection lens module having a smooth picture actuator, and the smooth picture actuator is disposed outside an optical engine, so as to avoid that the smooth picture actuator affects a size of the optical engine.

Other objectives and advantages of the invention can be further understood from the technical features disclosed in the invention.

To achieve one or some or all of the foregoing objectives or other objectives, an embodiment of the invention provides a projection lens module, configured to be connected to an optical engine of a projector. The projection lens module includes a projection lens and a smooth picture actuator, where the smooth picture actuator is fixed to the projection lens and is located outside the optical engine.

To achieve one or some or all of the foregoing objectives or other objectives, an embodiment of the invention provides a projector. The projector includes an optical engine and a projection lens module. The optical engine includes a casing, a light source, a light valve, and a prism. The light source is disposed in the casing and is configured to emit an illumination beam. The light valve is disposed in the casing and is configured to modulate the illumination beam to generate an image beam. The prism is disposed in the casing and is located on an optical path of the image beam. The projection lens module is connected to the casing of the optical engine and is configured to receive the image beam. The projection lens module includes a projection lens and a smooth picture actuator, where the smooth picture actuator is fixed to the projection lens and is located outside the casing of the optical engine.

Based on the foregoing, in the projector of the invention, the smooth picture actuator is disposed outside the optical engine and is disposed in the projection lens module, so that the smooth picture actuator does not affect the design and size of the optical engine in the projector. Since the volume of the optical engine is not affected by the smooth picture actuator, the volume of the optical engine can be reduced, and further the volume of the projector can be reduced. The design of pico projectors is therefore achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
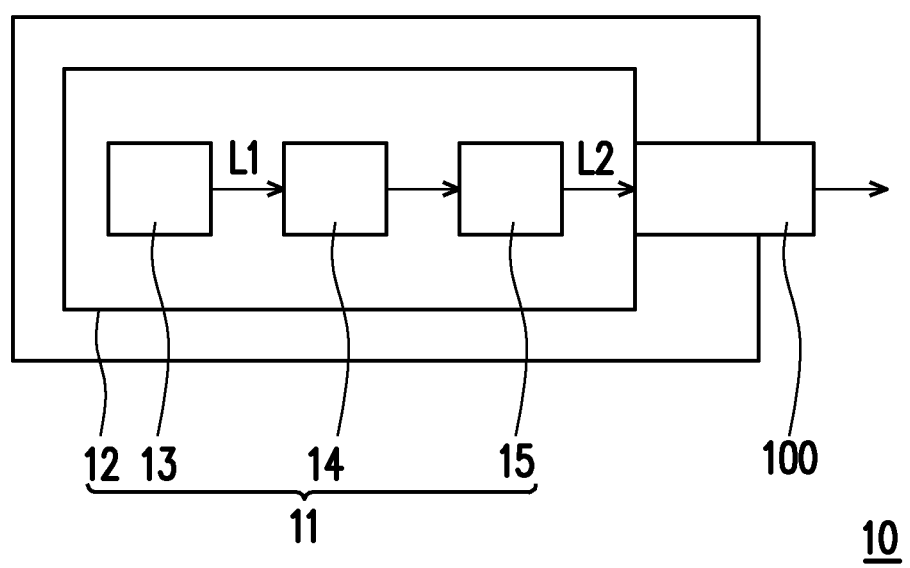
FIG. 1 is a schematic view of a projector according to an embodiment of the invention.

FIG. 1 is a schematic view of a projector according to an embodiment of the invention. Referring to FIG. 1, in the embodiment, a projector 10 includes an optical engine 11 and a projection lens module 100. The optical engine 11 includes a casing 12, a light source 13, a light valve 14, and a prism 15, where the light source 13, the light valve 14, and the prism 15 are disposed in the casing 12 of the optical engine 11. The light source 13 emits an illumination beam L1.

In some embodiments, the light source 13 may include a light emitting diode, a laser diode, or a lamp, or other light sources suitable for being used on the optical engine 11. Light emitted from the light source 13 is, for example, blue light, but may alternatively be a light beam of another color, which is not limited in the invention. For example, the light source 13 may include, for example, a plurality of laser elements (not shown in the figure). The laser elements are arranged, for example, in an array, and the laser elements are, for example, laser diodes (LDs). In other embodiments, there may alternatively be a plurality of light sources 13. In other embodiments, the light source 13 may be, for example, a solid-state illumination source using a light emitting diode or a plurality of light emitting diodes. In still other embodiments, the light source 13 may include a lamp.

In some embodiments, the light valve 14 is located on a transmission path of the illumination beam L1 and is configured to modulate the illumination beam L1 to generate an image beam L2. In the embodiment, the light valve 14 is, for example, a reflective light modulator such as a digital micro-mirror device (DMD) or a liquid crystal on silicon panel (LCoS panel). In some embodiments, the light valve 14 is, for example, a transmissive light modulator such as a transmissive liquid crystal display panel, an electro-optical modulator, a magneto-optic modulator, or an acousto-optic modulator (AOM). However, the invention is not intended to limit the form and type of the light valve 14.

In some embodiments, the prism 15 and the projection lens module 100 are located on an optical path of the image beam L2. The image beam L2 is transmitted towards the projection lens module 100 along the optical path through the prism 15 and is projected out of the projector 10 through the projection lens module 100.

In the embodiment, the prism 15 may include a prism group such as a total internal reflection prism (TIR prism), a reverse total internal reflection prism (RTIR prism), or a polarizer prism. In an embodiment, the RTIR prism may be formed by a triangular cylinder. The prism 15 may alternatively be formed by a combination of a plurality of polygonal cylinders or cones (including triangles) which fits with each other.

In the embodiment, the projection lens module 100 includes a projection lens 110 and a smooth picture actuator 120. The smooth picture actuator 120 is fixed to the projection lens module 100 and is located outside the optical engine 11. The projection lens 110 includes a first lens group module 112 and a second lens group module 118. In some embodiments, the smooth picture actuator 120 may be disposed between the first lens group module 112 and the second lens group module 118. However, the invention is not limited thereto. In other embodiments, the smooth picture actuator 120 may be disposed on an end of the projection lens 110.

In the embodiment, the projection lens 110 includes, for example, a combination of one or more non-planar optical lenses having a diopter, such as various combinations of non-planar lenses including a biconcave lens, a biconvex lens, a concavo-convex lens, a convexo-concave lens, a plano-convex lens, and a plano-concave lens. In an embodiment, the projection lens module 100 further includes planar optical lenses for projecting the image beam L2 out of the projector 10 in a reflective or transmissive manner. The invention is not intended to limit the form and type of the projection lens 110.

Figure 3:
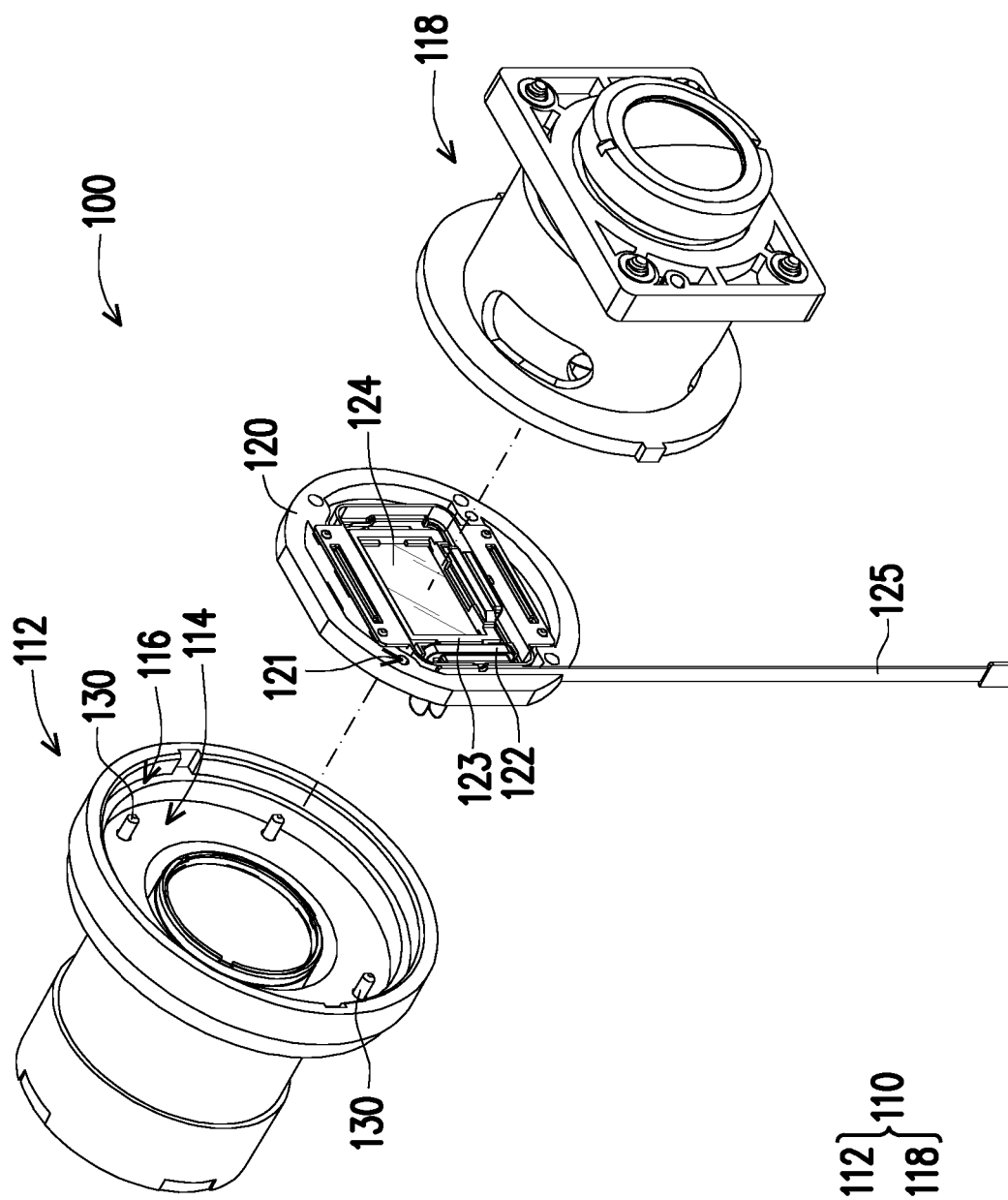
FIG. 3 is an exploded view of the projection lens module according to FIG. 2.

In the embodiment, the smooth picture actuator 120 includes a motor 122, an elastic member 123, an optical element 124, and a wire 125. In some embodiments, the elastic member 123 is interlinked to the motor 122, and the optical element 124 is connected to the elastic member 123. For example, the optical element 124 may be flat glass and may be rotationally oscillated on the basis of an optical axis. In other embodiments, the optical element 124 may alternatively be curved glass that may vibrate up and down perpendicular to the optical axis. The motor 122 on the smooth picture actuator 120 may be a voice coil motor or another suitable motor. There may be one motor 122 (as shown in FIG. 3), or a plurality of motors 122 may be disposed according to actual requirements. The wire 125 is electrically connected to the motor 122 and extends outside the projection lens module 100. Specifically, the motor 122 may be controlled by a drive chip on a circuit board (not shown) disposed outside the projection lens module 100, and the motor 122 is connected to the drive chip on the circuit board through the wire 125. When the motor 122 drives the elastic member 123 to vibrate, the optical element 124 connected to the elastic member 123 is driven to periodically move, for example, to oscillate or vibrate. Consequently, a specific translation distance is generated, and further the image resolution of the projector is increased.

In the embodiment, the projection lens module has favorable image resolution, which is described in the following.

Figure 2:
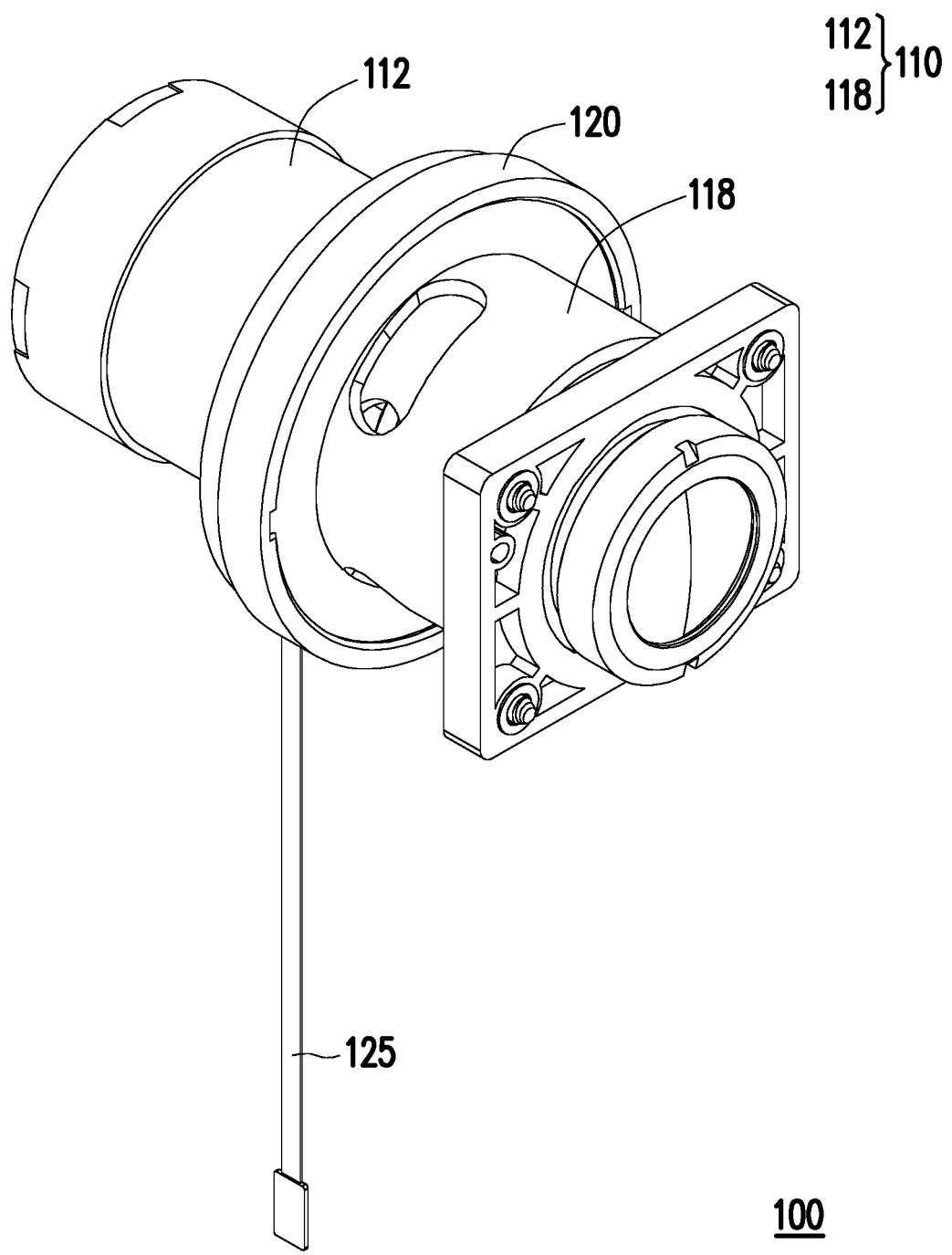
FIG. 2 is a schematic view of a projection lens module according to an embodiment of the invention.
Figure 4:
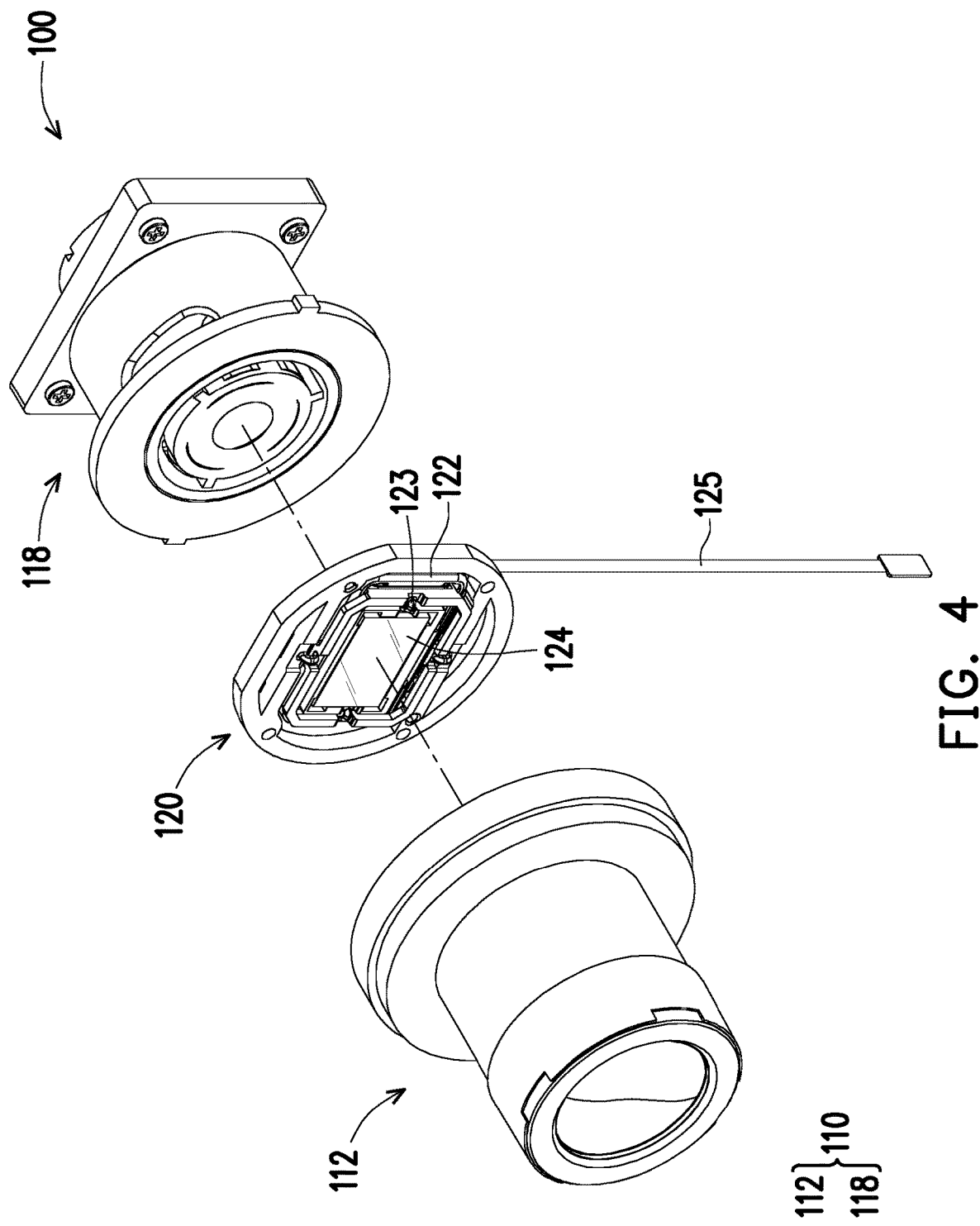
FIG. 4 is an exploded view of the projection lens module according to FIG. 2 from another angle of view.
Figure 5:
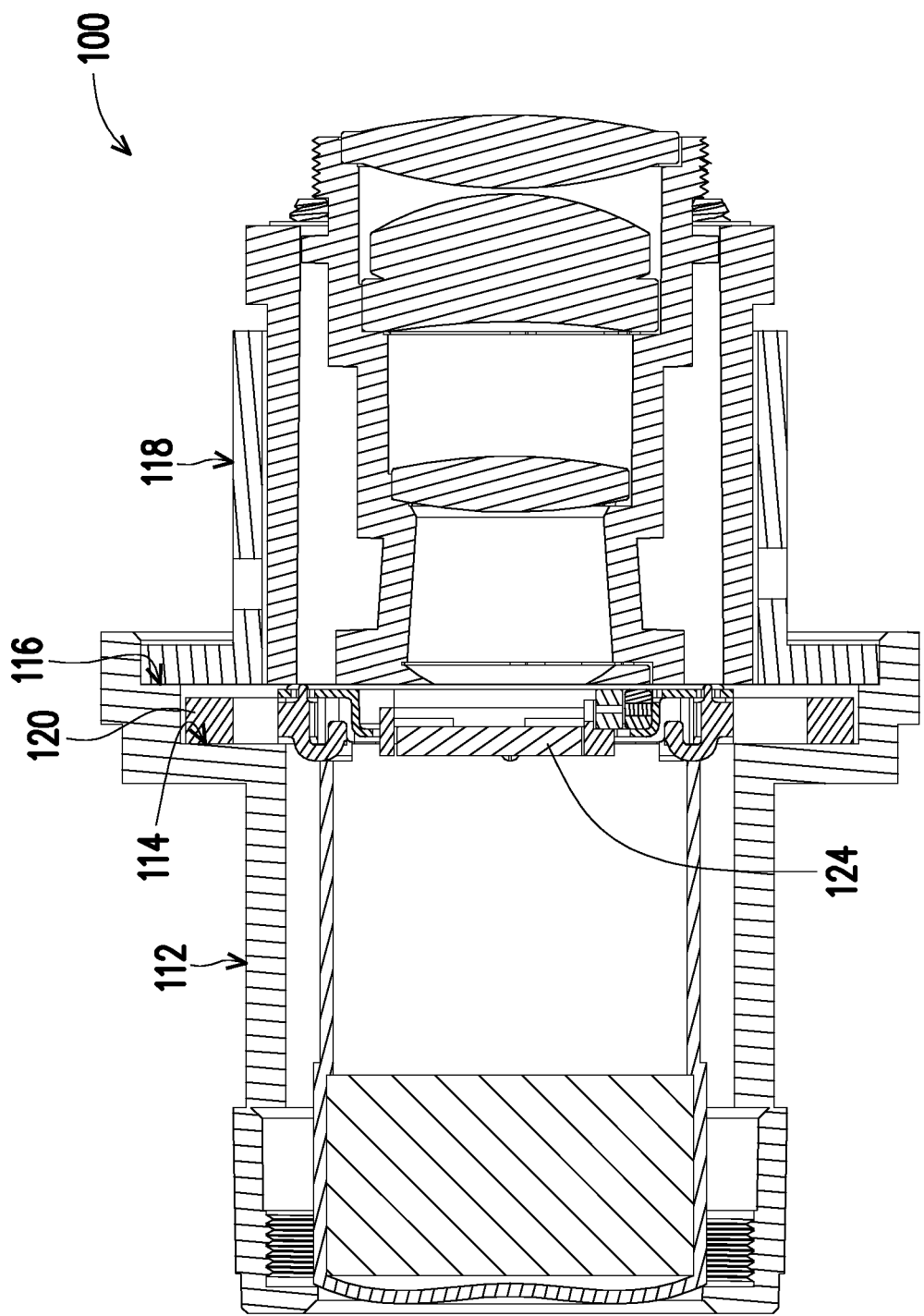
FIG. 5 is a cross-sectional view of the projection lens module according to FIG. 2.

FIG. 2 is a schematic view of a projection lens module according to an embodiment of the invention. FIG. 3 is an exploded view of the projection lens module according to FIG. 2. FIG. 4 is an exploded view of the projection lens module according to FIG. 2 from another angle of view. FIG. 5 is a cross-sectional view of the projection lens module according to FIG. 2.

Referring to FIG. 2 to FIG. 5, in the embodiment, the first lens group module 112 includes a first bearing reference surface 114 and a second bearing reference surface 116. The first bearing reference surface 114 is used for bearing the smooth picture actuator 120, and the second bearing reference surface 116 is used for bearing the second lens group module 118. A height difference is provided between the first bearing reference surface 114 and the second bearing reference surface 116, so that a stepped structure is formed. The first bearing reference surface 114 is located inside the second bearing reference surface 116. That is, the first bearing reference surface 114 may be regarded as an inner step and the second bearing reference surface 116 may be regarded as an outer step. In the embodiment, when the smooth picture actuator 120 abuts against the first bearing reference surface 114 and is mounted on the first lens group module 112 and the second lens group module 118 abuts against the second bearing reference surface 116 and is mounted on the first lens group module 112, the smooth picture actuator 120 is enclosed by a housing of the first lens group module 112.

In some embodiments, the projection lens 110 may include a plurality of first positioning structures 130. For example, the first positioning structures 130 may be disposed on the first bearing reference surface 114 of the first lens group module 112. The first positioning structures 130 are, for example, a plurality of columns protruding from the first bearing reference surface 114. The smooth picture actuator 120 may include a plurality of second positioning structures 121, where the second positioning structures 121 are, for example, a plurality of through holes. When the smooth picture actuator 120 is assembled with the first lens group module 112, the smooth picture actuator 120 abuts against the first bearing reference surface 114 of the first lens group module 112, and the plurality of first positioning structures 130 located on the first lens group module 112 respectively insert into the plurality of second positioning structures 121 located on the smooth picture actuator 120. In this way, an axis of the optical element 124 on the smooth picture actuator 120 is aligned with an axis of the first lens group module 112. In some embodiments, when the smooth picture actuator 120 is attached to the first bearing reference surface 114 of the first lens group module 112 and the second lens group module 118 abuts against the second bearing reference surface 116 of the first lens group module 112, an axis of the second lens group module 118 is aligned with the axis of the optical element 124 on the smooth picture actuator 120. That is, the axis of the optical element 124 on the smooth picture actuator 120, the axis of the first lens group module 112, and the axis of the second lens group module 118 may be aligned. However, the invention is not limited thereto. In other embodiments, the first positioning structures 130 may be concave portions or protruded columns, and the second positioning structures 121 may correspondingly be convex columns or protruded portions, so that the first positioning structures 130 may be concavo-convex fitted to the second positioning structures 121.

In some embodiments, the smooth picture actuator 120 and the first lens group module 112 may be locked, for example, by screws, and a gasket may be provided at a connection therebetween to fill a gap. In this way, the connection between the smooth picture actuator 120 and the first lens group module 112 is ensured to be a rigid design, so that the periodic oscillation of the optical element 124 may achieve the correct amount of displacement, and that the required imaging quality is implemented. In addition, because the first lens group module 112 has the first bearing reference surface 114 and the second bearing reference surface 116 corresponding to the smooth picture actuator 120 and the second lens group module 118 respectively, the height difference is provided between the first bearing reference surface 114 and the second bearing reference surface 116. Moreover, the first lens group module 112 and the smooth picture actuator 120 have positioning structures (for example, the first positioning structures 130 and the second positioning structures 121) corresponding to each other. Therefore, accumulated tolerance of stacking assembly can be decreased, and assembly difficulty can be reduced.

In the embodiment, an outer contour of the smooth picture actuator 120 corresponds to a contour of the projection lens 110. Further, the outer contour of the smooth picture actuator 120 may correspond to an outer contour of the first lens group module 112 or the second lens group module 118 of the projection lens 110. In the embodiment, because the contours of the first lens group module 112 and the second lens group module 118 are in a circle shape, to fit the contour shape of the first lens group module 112 and the second lens group module 118, the smooth picture actuator 120 may be designed as a circular frame structure. In other embodiments, if the contours of the first lens group module 112 and the second lens group module 118 are in a square, a rectangle, another polygon, or another shape, the frame structure of the smooth picture actuator 120 may alternatively be configured in a shape conforming to or matching a lens shape. The invention is not limited thereto.

In some embodiments, the wire 125 may be an enameled wire and is electrically connected to a circuit board (not shown) in the projector 10. The circuit board may be a flexible printed circuit (FPC) or may be any suitable circuit board connected to the wire 125. In the embodiment, the circuit board may be disposed inside the optical engine 11. In other embodiments, to reduce the volume of the optical engine 11, the circuit board may alternatively be disposed outside the optical engine 11. In still other embodiments, when the projection lens 100 is an auto focus lens or a motorized zoom lens, the circuit board may alternatively be applied to the projection lens 100, which is not limited in the invention.

In the foregoing embodiments, the smooth picture actuator 120 of the projection lens module 100 is disposed between the first lens group module 112 and the second lens group module 118 and is disposed outside the casing 12 of the optical engine 11. In this way, the volume of the optical engine 11 can be minimized. On the other hand, the smooth picture actuator 120 of the projection lens module 100 may be detachably disposed in the projection lens module 100, and the smooth picture actuator 120 may be replaced according to the requirement on actual image resolution, which is beneficial to future expandability.

Figure 6:
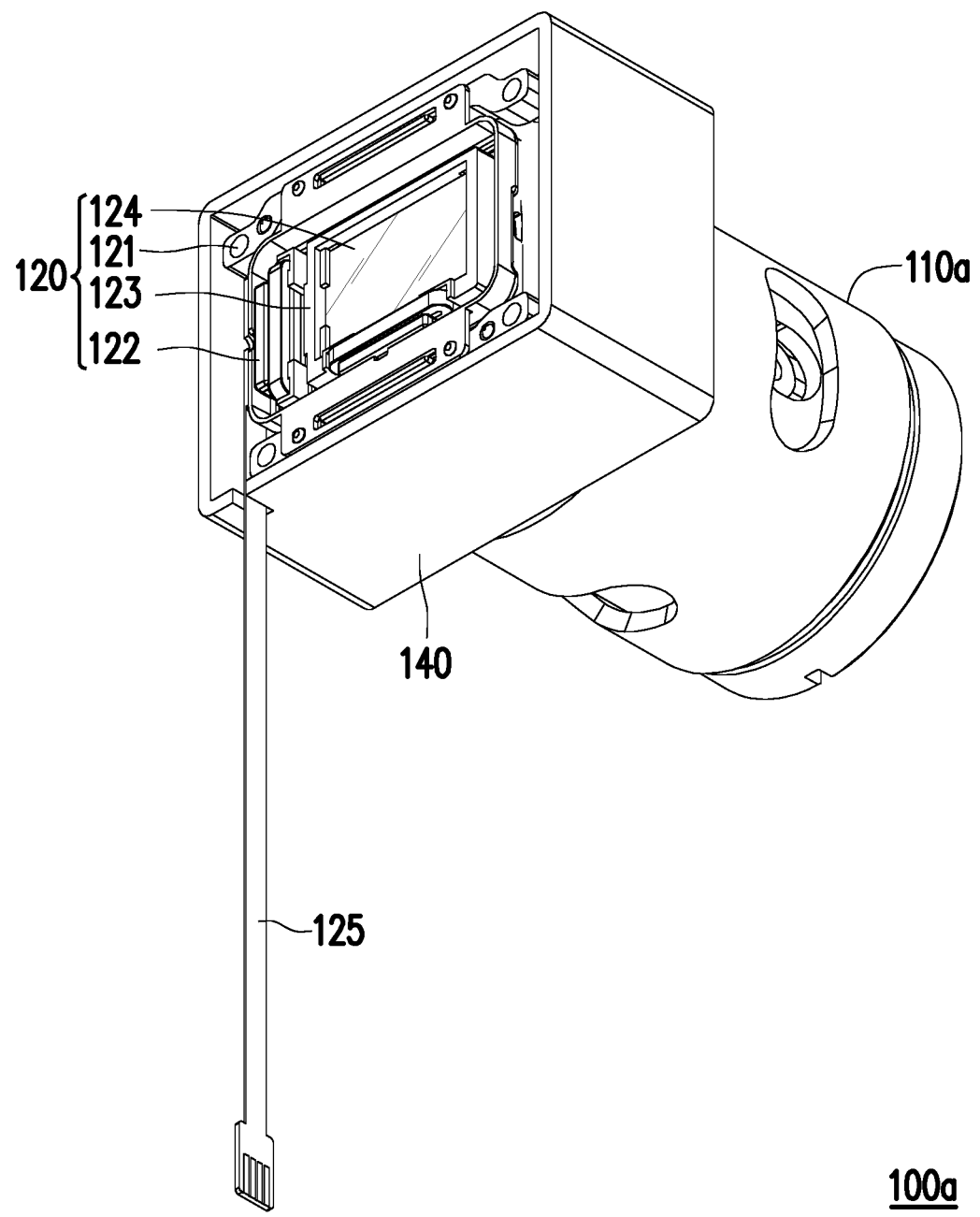
FIG. 6 is a schematic view of a projection lens module according to another embodiment of the invention.
Figure 7:
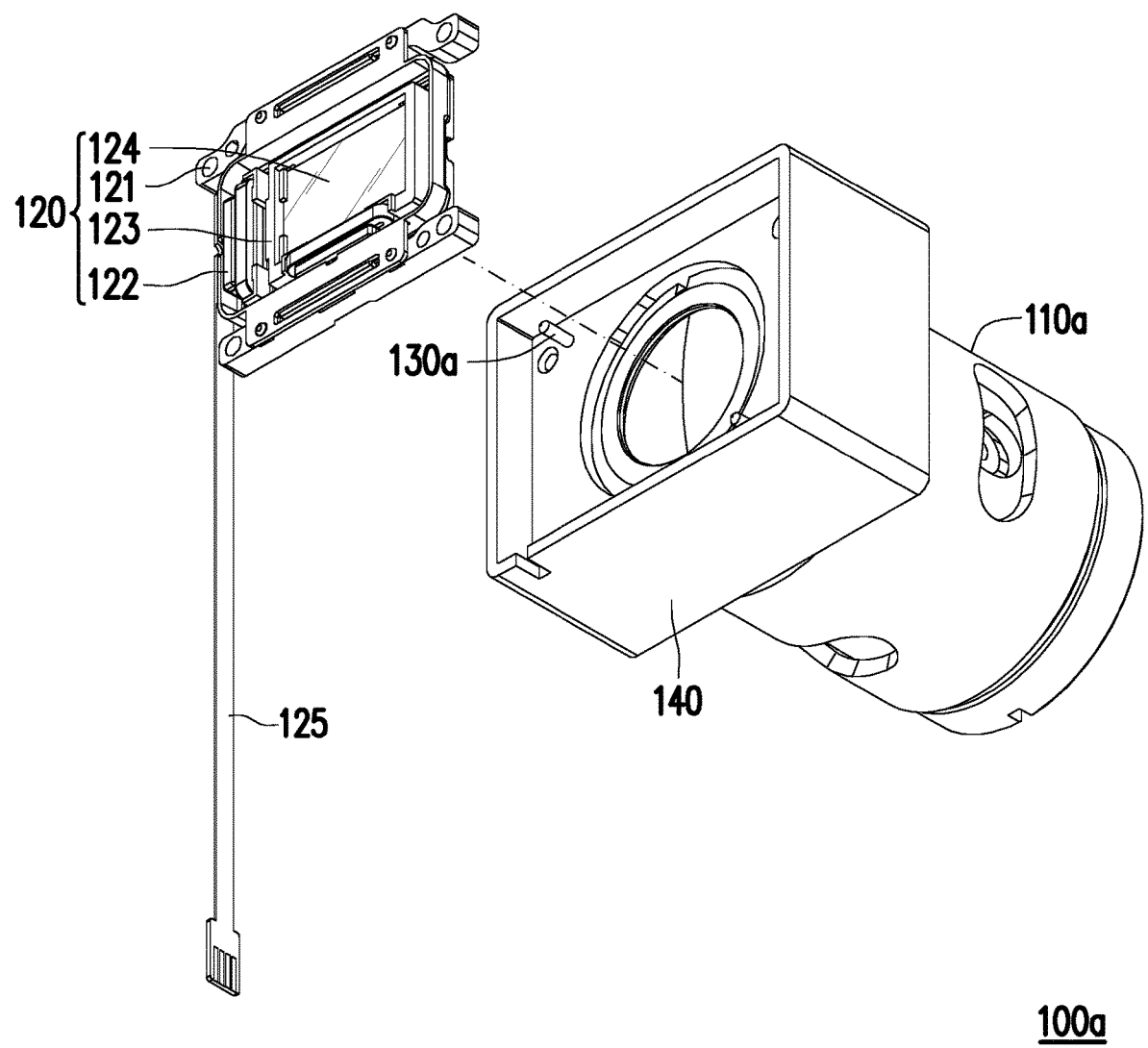
FIG. 7 is an exploded view of the projection lens module according to FIG. 6.
Figure 8:
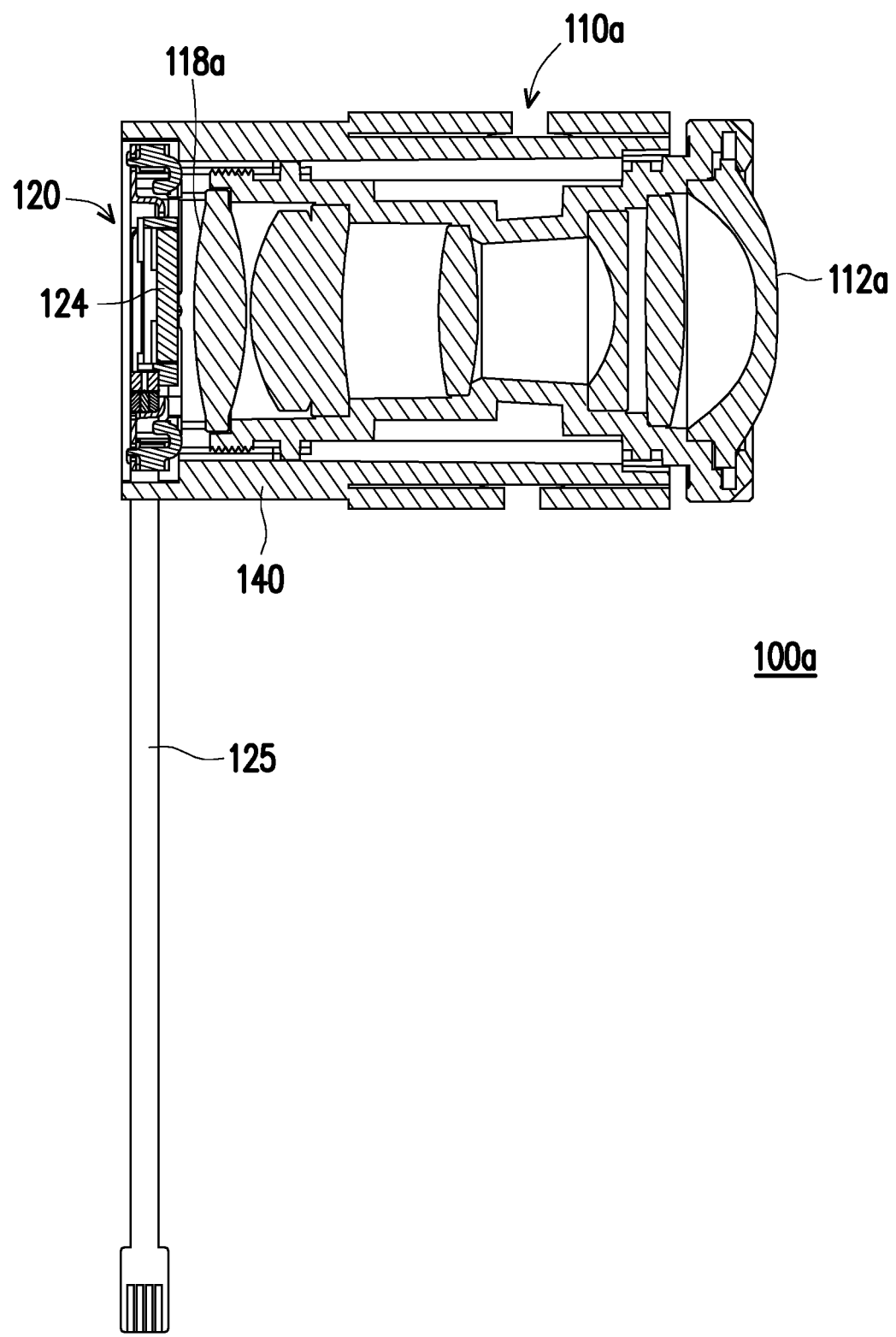
FIG. 8 is a cross-sectional view of the projection lens module according to FIG. 6.

FIG. 6 is a schematic view of a projection lens module according to another embodiment of the invention. FIG. 7 is an exploded view of the projection lens module according to FIG. 6. FIG. 8 is a cross-sectional view of the projection lens module according to FIG. 6. Referring to FIG. 6 to FIG. 8 together, a main difference of a projection lens module 100a in the embodiment from the projection lens module 100 in the foregoing embodiments is that the smooth picture actuator 120 of the projection lens module 100a in the embodiment is disposed on an end of a projection lens 110a, instead of being disposed in the middle of the projection lens 100a. In the embodiment, the projection lens 110a includes a first lens group module 112a and a second lens group module 118a (shown in FIG. 8), where the second lens group module 118a is closer to the optical engine 11 (shown in FIG. 1) than the first lens group module 112a. The smooth picture actuator 120 in the embodiment is disposed on an end of the second lens group module 118a, that is, located between the second lens group module 118a and the optical engine 11.

In some embodiments, the projection lens module 100a further includes a housing 140, where the housing 140 encloses the end of the projection lens 110a and the smooth picture actuator 120, so that the smooth picture actuator 120 may be embedded in the housing 140 and connected to the end of the projection lens 110a. In addition, the wire 125 of the smooth picture actuator 120 may extend outside the housing 140 of the projection lens module 100a and is electrically connected to a circuit board (not shown).

Further, a first positioning structure 130a may be disposed on the housing 140 of the projection lens module 100a, and there may be a plurality of first positioning structures. When the smooth picture actuator 120 is disposed on the end of the projection lens 110a, the plurality of second positioning structures 121 on the smooth picture actuator 120 may be bonded to or be concavo-convex fitted to the plurality of first positioning structures 130a on the housing 140, so that the smooth picture actuator 120 may be fixed to the end of the projection lens 110a. In this case, the axis of the optical element 124 on the smooth picture actuator 120 is aligned with an axis of the projection lens 110a. In the embodiment, because the smooth picture actuator 120 is disposed on the end of the projection lens 110a, the smooth picture actuator 120 may be more easily assembled or disassembled, and the smooth picture actuator 120 may be replaced according to the requirement on resolution. The use range and the expandability of the projection lens module 100a are thereby increased.

Based on the foregoing, in the projector of the invention, the smooth picture actuator is disposed outside the optical engine and is disposed in the projection lens module, so that the smooth picture actuator does not affect the design and size of the optical engine in the projector. Since the volume of the optical engine is not affected by the smooth picture actuator, the volume of the optical engine can be reduced, and further the volume of the projector can be reduced. The design of pico projectors is therefore achieved. In addition, because the smooth picture actuator is disposed on the projection lens module, the smooth picture actuator may be easily to be assembled or disassembled. Therefore, the smooth picture actuator can be replaced according to the requirement on actual resolution, which is beneficial to future expandability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens module, configured to be connected to an optical engine of a projector, wherein the projection lens module comprises a projection lens, a smooth picture actuator and a first positioning structure, wherein
    the smooth picture actuator is fixed to the projection lens and is located outside the optical engine,
    the smooth picture actuator comprises a second positioning structure, and the first positioning structure is concavo-convex fitted to the second positioning structure.

2. The projection lens module according to claim 1, wherein the projection lens comprises a first lens group module and a second lens group module, and the smooth picture actuator is disposed between the first lens group module and the second lens group module.

3. The projection lens module according to claim 2, wherein the first lens group module is provided with a first bearing reference surface and a second bearing reference surface, the smooth picture actuator abuts against the first bearing reference surface, and the second lens group module abuts against the second bearing reference surface.

4. The projection lens module according to claim 1, wherein the smooth picture actuator comprises a motor, an elastic member interlinked to the motor, an optical element connected to the elastic member, and a wire electrically connected to the motor and extending outside the projection lens module, wherein the motor drives the optical element by the elastic member to move.

5. The projection lens module according to claim 1, wherein an outer contour of the smooth picture actuator corresponds to an outer contour of the projection lens.

6. The projection lens module according to claim 1, wherein the smooth picture actuator is disposed on an end of the projection lens.

7. The projection lens module according to claim 6, wherein the projection lens module further comprises a housing enclosing the end of the projection lens and the smooth picture actuator.

8. A projector, wherein the projector comprises an optical engine and a projection lens module, wherein the optical engine comprises a casing, a light source, a light valve, and a prism, wherein the light source is disposed in the casing and is configured to emit an illumination beam;

the light valve is disposed in the casing and is configured to modulate the illumination beam to generate an image beam;

the prism is disposed in the casing and is located on an optical path of the image beam; and the projection lens module is connected to the casing of the optical engine and is configured to receive the image beam, and the projection lens module comprises a projection lens, a smooth picture actuator and a first positioning structure, wherein the projection lens is configured to project the image beam; and the smooth picture actuator is fixed to the projection lens and is located outside the casing of the optical engine, the smooth picture actuator comprises a second positioning structure, and the first positioning structure is concavo-convex fitted to the second positioning structure.

9. The projector according to claim 8, wherein the projection lens comprises a first lens group module and a second lens group module, and the smooth picture actuator is disposed between the first lens group module and the second lens group module.

10. The projector according to claim 9, wherein the first lens group module is provided with a first bearing reference surface and a second bearing reference surface, the smooth picture actuator abuts against the first bearing reference surface, and the second lens group module abuts against the second bearing reference surface.

11. The projector according to claim 8, wherein the smooth picture actuator comprises a motor, an elastic member interlinked to the motor, an optical element connected to the elastic member, and a wire electrically connected to the motor and extending outside, wherein the motor drives the optical element by the elastic member to move.

12. The projector according to claim 8, wherein an outer contour of the smooth picture actuator corresponds to an outer contour of the projection lens.

13. The projector according to claim 8, wherein the smooth picture actuator is disposed on an end of the projection lens.

14. The projector according to claim 13, wherein the projection lens module further comprises a housing enclosing the end of the projection lens and the smooth picture actuator.

* * * * *